(12) United States Patent
Habibi et al.

(10) Patent No.: US 10,782,584 B2
(45) Date of Patent: Sep. 22, 2020

(54) SYSTEM FOR FILLING ELECTROCHROMIC MIRROR ELEMENT

(71) Applicant: MAGNA MIRRORS OF AMERICA, INC., Holland, MI (US)

(72) Inventors: Hamid Habibi, Holland, MI (US); Michael L. Gallas, South Haven, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 276 days.

(21) Appl. No.: 15/899,100

(22) Filed: Feb. 19, 2018

(65) Prior Publication Data

US 2018/0173072 A1 Jun. 21, 2018

Related U.S. Application Data

(63) Continuation of application No. 15/273,753, filed on Sep. 23, 2016, now Pat. No. 9,897,889, which is a
(Continued)

(51) Int. Cl.
*G02F 1/161* (2006.01)
*B32B 17/10* (2006.01)
*G02F 1/1341* (2006.01)
*B60R 1/08* (2006.01)
*B29D 11/00* (2006.01)
(Continued)

(52) U.S. Cl.
CPC ........ *G02F 1/161* (2013.01); *B29D 11/00596* (2013.01); *B32B 17/10917* (2013.01); *B60R 1/088* (2013.01); *G02F 1/1341* (2013.01); *B29K 2063/00* (2013.01); *B29K 2105/20* (2013.01);
(Continued)

(58) Field of Classification Search
CPC ........ G02F 1/161; G02F 1/157; G02F 1/1341; B32B 17/10917; B29C 39/126
See application file for complete search history.

(56) References Cited

U.S. PATENT DOCUMENTS 3,215,038 A 11/1965 Heller et al.
3,280,701 A 10/1966 Donnelly et al.
(Continued)

FOREIGN PATENT DOCUMENTS

JP 5691220 7/1981
JP 2114237 4/1990
JP 2005/256802 9/2005

*Primary Examiner* — Robert B Davis
(74) *Attorney, Agent, or Firm* — Honigman LLP (57) ABSTRACT

A system for filling a vehicular electrochromic rearview mirror reflective element includes a filling crucible, a compressible sealing element, and a fixture configured to support an unfilled mirror cell. The filling crucible includes a fluid reservoir, a mirror cell receiving portion and a channel between the fluid reservoir and the mirror element receiving portion. The mirror cell receiving portion of the filling crucible is shaped to receive a perimeter portion of the unfilled mirror cell therein such that the fill port of the unfilled mirror cell is aligned with the channel of the filling crucible. With the unfilled mirror cell supported at the fixture, the mirror cell receiving portion of the filling crucible receives the upper perimeter portion of the unfilled mirror cell with the compressible sealing element between the filling crucible and the unfilled mirror cell. The mirror cell is filled under negative pressure.

18 Claims, 5 Drawing Sheets

Related U.S. Application Data continuation of application No. 14/535,741, filed on Nov. 7, 2014, now Pat. No. 9,454,054.

(60) Provisional application No. 61/905,464, filed on Nov. 18, 2013.

(51) Int. Cl.
 G02F 1/157 (2006.01)
 B29K 63/00 (2006.01)
 B29K 105/20 (2006.01)

(52) U.S. Cl.
 CPC .............. B29K 2995/003 (2013.01); B29K 2995/0005 (2013.01); G02F 1/157 (2013.01)

(56) References Cited

U.S. PATENT DOCUMENTS

| | | |
|---|---|---|
| 3,451,741 A | 6/1969 | Manos |
| 3,453,038 A | 7/1969 | Kissa et al. |
| 3,521,941 A | 7/1970 | Deb et al. |
| 3,652,149 A | 3/1972 | Rogers |
| 3,692,388 A | 9/1972 | Hall, Jr. et al. |
| 3,774,988 A | 11/1973 | Rogers |
| 3,806,229 A | 4/1974 | Schoot et al. |
| 3,807,832 A | 4/1974 | Castellion |
| 3,817,389 A | 6/1974 | Weichselbaum |
| 3,837,129 A | 9/1974 | Losell |
| 3,854,794 A | 12/1974 | Van Dam et al. |
| 3,873,185 A | 3/1975 | Rogers |
| 4,116,545 A | 9/1978 | Reddy |
| 4,135,789 A | 1/1979 | Hall |
| 4,139,234 A | 2/1979 | Morgan |
| 4,142,783 A | 3/1979 | Engler et al. |
| 4,149,974 A | 4/1979 | Bolton et al. |
| 4,174,152 A | 11/1979 | Giglia et al. |
| 4,227,779 A | 10/1980 | Bissar et al. |
| 4,239,350 A | 12/1980 | Morita et al. |
| 4,282,272 A | 8/1981 | Matsuhiro et al. |
| 4,294,518 A | 10/1981 | O'Connor et al. |
| RE30,835 E | 12/1981 | Giglia |
| 4,304,465 A | 12/1981 | Diaz |
| 4,306,774 A | 12/1981 | Nicholson |
| 4,338,000 A | 7/1982 | Kamimori et al. |
| 4,435,048 A | 3/1984 | Kamimori et al. |
| 4,440,910 A | 4/1984 | O'Connor |
| 4,449,786 A | 5/1984 | McCord |
| 4,465,339 A | 8/1984 | Baucke et al. |
| 4,473,695 A | 9/1984 | Wrighton et al. |
| 4,519,930 A | 5/1985 | Kakiuchi |
| 4,550,982 A | 11/1985 | Hirai |
| 4,561,625 A | 12/1985 | Weaver |
| 4,586,792 A | 5/1986 | Yang et al. |
| 4,613,211 A | 9/1986 | Papir et al. |
| 4,652,090 A | 3/1987 | Uchikawa et al. |
| 4,671,619 A | 6/1987 | Kamimori et al. |
| 4,702,566 A | 10/1987 | Tukude |
| 4,712,879 A | 12/1987 | Lynam et al. |
| 4,741,603 A | 5/1988 | Miyagi et al. |
| 4,750,817 A | 6/1988 | Sammells |
| 4,753,276 A | 6/1988 | Inaba |
| 4,761,061 A | 8/1988 | Nishiyama et al. |
| 4,795,242 A | 1/1989 | Wudl et al. |
| 4,807,977 A | 2/1989 | Sammells |
| 4,810,067 A | 3/1989 | Demiryont |
| 4,824,221 A | 4/1989 | Endo et al. |
| 4,832,467 A | 5/1989 | Miyagi et al. |
| 4,852,979 A | 8/1989 | Agrawal |
| 4,871,236 A | 10/1989 | Gemma et al. |
| 4,872,745 A | 10/1989 | Fujisawa et al. |
| 4,893,908 A | 1/1990 | Wolf et al. |
| 4,902,108 A | 2/1990 | Byker |
| 4,908,283 A | 3/1990 | Takahashi et al. |
| 4,927,246 A | 5/1990 | Ito et al. |
| 4,962,158 A | 10/1990 | Kobayashi et al. |
| 4,973,844 A | 11/1990 | O'Farrell et al. |
| 4,993,810 A | 2/1991 | Demiryont |
| 5,028,124 A | 7/1991 | Akhtar |
| 5,042,923 A | 8/1991 | Wolf et al. |
| 5,052,163 A | 10/1991 | Czekala |
| 5,066,112 A | 11/1991 | Lynam et al. |
| 5,068,062 A | 11/1991 | Inata et al. |
| 5,069,535 A | 12/1991 | Baucke et al. |
| 5,073,012 A | 12/1991 | Lynam |
| 5,076,673 A | 12/1991 | Lynam et al. |
| 5,076,674 A | 12/1991 | Lynam |
| 5,080,471 A | 1/1992 | Cogan et al. |
| 5,089,108 A | 2/1992 | Small |
| 5,115,346 A | 5/1992 | Lynam |
| 5,122,896 A | 6/1992 | Mizusaki et al. |
| 5,128,799 A | 7/1992 | Byker |
| 5,134,175 A | 7/1992 | Lucey |
| 5,140,455 A | 8/1992 | Varaprasad et al. |
| 5,142,407 A | 8/1992 | Varaprasad et al. |
| 5,148,014 A | 9/1992 | Lynam et al. |
| 5,151,816 A | 9/1992 | Varaprasad et al. |
| 5,180,757 A | 1/1993 | Lucey |
| 5,202,787 A | 4/1993 | Byker et al. |
| 5,206,756 A | 4/1993 | Cheshire |
| 5,207,492 A | 5/1993 | Roberts |
| 5,231,531 A | 7/1993 | Defendini et al. |
| 5,233,461 A | 8/1993 | Doman et al. |
| 5,239,405 A | 8/1993 | Varaprasad et al. |
| 5,239,406 A | 8/1993 | Lynam |
| 5,253,109 A | 10/1993 | O'Farrell et al. |
| 5,278,693 A | 1/1994 | Theiste et al. |
| 5,280,380 A | 1/1994 | Byker |
| 5,282,077 A | 1/1994 | Byker |
| 5,353,148 A | 10/1994 | Eid et al. |
| 5,356,947 A | 10/1994 | Ali et al. |
| 5,360,837 A | 11/1994 | Honda et al. |
| 5,379,146 A | 1/1995 | Defendini |
| 5,406,414 A | 4/1995 | O'Farrell et al. |
| 5,457,218 A | 10/1995 | Cronin et al. |
| 5,490,868 A | 2/1996 | Whitlock et al. |
| 5,492,143 A | 2/1996 | Cooper et al. |
| 5,500,760 A | 3/1996 | Varaprasad et al. |
| 5,525,264 A | 6/1996 | Cronin et al. |
| 5,554,664 A | 9/1996 | Lamanna et al. |
| 5,567,749 A | 10/1996 | Sawamura et al. |
| 5,572,354 A | 11/1996 | Desmond et al. |
| 5,576,687 A | 11/1996 | Blank et al. |
| 5,610,756 A | 3/1997 | Lynam et al. |
| 5,668,663 A | 9/1997 | Varaprasad et al. |
| 5,672,273 A | 9/1997 | Ball |
| 5,679,283 A | 10/1997 | Tonar et al. |
| 5,724,187 A | 3/1998 | Varaprasad et al. |
| 5,790,298 A | 8/1998 | Tonar |
| 5,818,625 A | 10/1998 | Forgette et al. |
| 5,910,854 A | 6/1999 | Varaprasad et al. |
| 5,928,572 A | 7/1999 | Tonar et al. |
| 5,940,201 A | 8/1999 | Ash et al. |
| 5,951,728 A | 9/1999 | Hopson |
| 6,002,511 A | 12/1999 | Varaprasad et al. |
| 6,063,839 A | 5/2000 | Oosedo et al. |
| 6,064,508 A | 5/2000 | Forgette et al. |
| 6,095,203 A | 8/2000 | Yamamoto |
| 6,102,546 A | 8/2000 | Carter |
| 6,157,480 A | 12/2000 | Anderson et al. |
| 6,166,849 A | 12/2000 | Coleman et al. |
| 6,178,034 B1 | 1/2001 | Allemand et al. |
| 6,188,505 B1 | 2/2001 | Lomprey et al. |
| 6,193,378 B1 | 2/2001 | Tonar et al. |
| 6,195,193 B1 | 2/2001 | Anderson et al. |
| 6,207,083 B1 | 3/2001 | Varaprasad et al. |
| 6,293,843 B1 | 9/2001 | Toya et al. |
| 6,309,546 B1 | 10/2001 | Herrmann et al. |
| 6,317,248 B1 | 11/2001 | Agrawal et al. |
| 6,346,192 B2 | 2/2002 | Buhr et al. |
| 6,361,879 B1 | 3/2002 | Tsutsumi et al. |
| 6,407,847 B1 | 6/2002 | Poll et al. |
| 6,420,036 B1 | 7/2002 | Varaprasad et al. |
| 6,449,082 B1 | 9/2002 | Agrawal et al. |
| 6,521,354 B1 | 2/2003 | Shimizu et al. |

(56) References Cited

U.S. PATENT DOCUMENTS

| | | |
|---|---|---|
| 6,535,322 B2 | 3/2003 | Asano et al. |
| 6,555,187 B1 | 4/2003 | Kitamura |
| 6,595,649 B2 | 7/2003 | Hoekstra et al. |
| 6,620,510 B1 | 9/2003 | Taguchi et al. |
| 6,648,477 B2 | 11/2003 | Hutzel et al. |
| 6,690,268 B2 | 2/2004 | Schofield et al. |
| 6,714,334 B2 | 3/2004 | Tonar |
| 6,781,738 B2 | 8/2004 | Kikuchi et al. |
| 6,787,606 B1 | 9/2004 | Chen |
| 6,842,276 B2 | 1/2005 | Poll et al. |
| 6,870,656 B2 | 3/2005 | Tonar et al. |
| 6,906,842 B2 | 6/2005 | Agrawal et al. |
| 7,047,633 B2 | 5/2006 | Morganelli et al. |
| 7,075,112 B2 | 7/2006 | Roberts et al. |
| 7,110,156 B2 | 9/2006 | Lawlor et al. |
| 7,182,830 B2 | 2/2007 | Liang et al. |
| 7,184,190 B2 | 2/2007 | McCabe et al. |
| 7,190,505 B1 | 3/2007 | Stray et al. |
| 7,195,381 B2 | 3/2007 | Lynam et al. |
| 7,255,451 B2 | 8/2007 | McCabe et al. |
| 7,274,501 B2 | 9/2007 | McCabe et al. |
| 7,289,037 B2 | 10/2007 | Uken et al. |
| 7,310,178 B2 | 12/2007 | Lawlor et al. |
| 7,324,261 B2 | 1/2008 | Tonar et al. |
| 7,360,932 B2 | 4/2008 | Uken et al. |
| 7,370,983 B2 | 5/2008 | DeWind et al. |
| 7,446,650 B2 | 11/2008 | Schofield et al. |
| 7,457,027 B2 | 11/2008 | LeCompte et al. |
| 7,494,231 B2 | 2/2009 | Varaprasad et al. |
| 7,525,714 B2 | 4/2009 | Poll et al. |
| 7,612,929 B2 | 11/2009 | Tonar et al. |
| 7,626,749 B2 | 12/2009 | Baur et al. |
| 7,719,750 B2 | 5/2010 | Tonar et al. |
| 7,733,555 B2 | 6/2010 | Agrawal et al. |
| 7,806,744 B2 | 10/2010 | Ota et al. |
| 7,855,755 B2 | 12/2010 | Weller et al. |
| 7,884,995 B2 | 2/2011 | Tonar et al. |
| 8,018,638 B2 | 9/2011 | LeCompte et al. |
| 8,075,772 B2 | 12/2011 | Suga |
| 8,277,059 B2 | 10/2012 | McCabe et al. |
| 9,454,054 B2 | 9/2016 | Habibi et al. |
| 9,897,889 B2 | 2/2018 | Habibi et al. |
| 2001/0055143 A1 | 12/2001 | Ash et al. |
| 2005/0195488 A1 | 9/2005 | McCabe et al. |
| 2006/0050018 A1 | 3/2006 | Hutzel et al. |
| 2006/0061008 A1 | 3/2006 | Karner et al. |
| 2011/0299170 A1 | 12/2011 | Harlow et al. |
| 2012/0038964 A1 | 2/2012 | De Wind et al. |
| 2012/0236388 A1 | 9/2012 | De Wind et al. |

SYSTEM FOR FILLING ELECTROCHROMIC MIRROR ELEMENT

CROSS REFERENCE TO RELATED APPLICATIONS

The present application is a continuation of U.S. patent application Ser. No. 15/273,753, filed Sep. 23, 2016, now U.S. Pat. No. 9,897,889, which is a continuation of U.S. patent application Ser. No. 14/535,741, filed Nov. 7, 2014, now U.S. Pat. No. 9,454,054, which claims the filing benefits of U.S. provisional application Ser. No. 61/905,464 filed Nov. 18, 2013, which is hereby incorporated herein by reference in its entirety.

FIELD OF THE INVENTION

The present invention relates generally to reflective element assemblies for rearview mirrors of vehicles and, more particularly, to electro-optic or electrochromic reflective element assemblies and a method for manufacturing electro-optic or electrochromic reflective element assemblies.

BACKGROUND OF THE INVENTION

Automotive electrochromic mirror reflective element cell assemblies typically include a front substrate and a rear substrate and an electrochromic medium sandwiched therebetween and contained within an interpane cavity. The substrates are shaped as desired by the automobile manufacturer for a particular mirror design or application. For example, an interior rearview mirror reflective element may have substrates that are generally oval or trapezoidal in shape and are formed to be approximately 20-26 cm long and 5-8 cm tall or wide. Exterior mirror reflective element assemblies are shaped differently and may have sharper radii at the corners and may be flat or convex or aspheric, depending on the particular application. The size of the substrates for the exterior reflective element assemblies may vary from about 7 cm by 7 cm to about 10 cm by 18 cm or larger.

During manufacture and assembly of the reflective cell element assembly, the respective front and rear substrates are often cut or broken out as cut shapes from larger flat or curved lites, typically glass sheets or lites. The individual front and rear cut shapes or substrates are cleaned and then coated with a conductive or semiconductive coating or coatings that are reflective or transparent. After they are coated, an uncured adhesive material, typically an uncured epoxy material (often containing spacer beads, such as glass beads or the like), is applied around the perimeter of one of the cut shapes or substrates, and polymethylmethacrylate (PMMA) beads are added at the substrate and inboard of the epoxy material, and the other cut shape or substrate is superimposed thereupon and spaced apart from the first cut shape by the applied perimeter material. The uncured adhesive material is then cured, such as by heating, to adhere the shapes or substrates together and to space the substrates apart a desired or appropriate or selected amount to define an appropriate interpane cavity spacing. The substrates, so adhered together and interspaced apart, form an empty cell with an interpane cavity between the substrates and bounded by the perimeter seal.

Next, an electrolyte or monomer composition is filled into the cavity via an aperture (commonly known as a fill port or plug hole) provided in the perimeter material or seal, such as via a vacuum fill process. During the filling process, the interpane cavity is in a vacuum and the empty cell is disposed in a vacuum chamber. Thus, when the fill port is placed in a source of electrochromic fluid, and the chamber is pressurized or vented to atmosphere, the fluid is drawn up into the vacuumed interpane cavity to fill the cell. The beads in the interpane cavity are required, at least for larger cells, to avoid collapsing of the cell when the chamber is at a higher pressure than the interpane cavity. After the cell is filled and the port is plugged, the cell may be heated to dissolve the beads, and the cell is cleaned to remove the electrochromic fluid that is present at the surface of the cell and around the fill port.

SUMMARY OF THE INVENTION

The present invention provides a method of making automotive electrochromic reflective cell element assemblies for automotive rearview mirror assemblies, particularly exterior rearview mirror assemblies, by providing a top filling process, which fills the cell via gravity or via slightly pressurized fluid. Optionally, aspects of the present invention may be suitable for application to other devices or cells with filled interpane cavities, such as, for example, display elements or devices (such as liquid crystal display devices) and/or windows and/or the like.

These and other objects, advantages, purposes and features of the present invention will become apparent upon review of the following specification in conjunction with the drawings.

DESCRIPTION OF THE PREFERRED EMBODIMENTS

Figure 1:
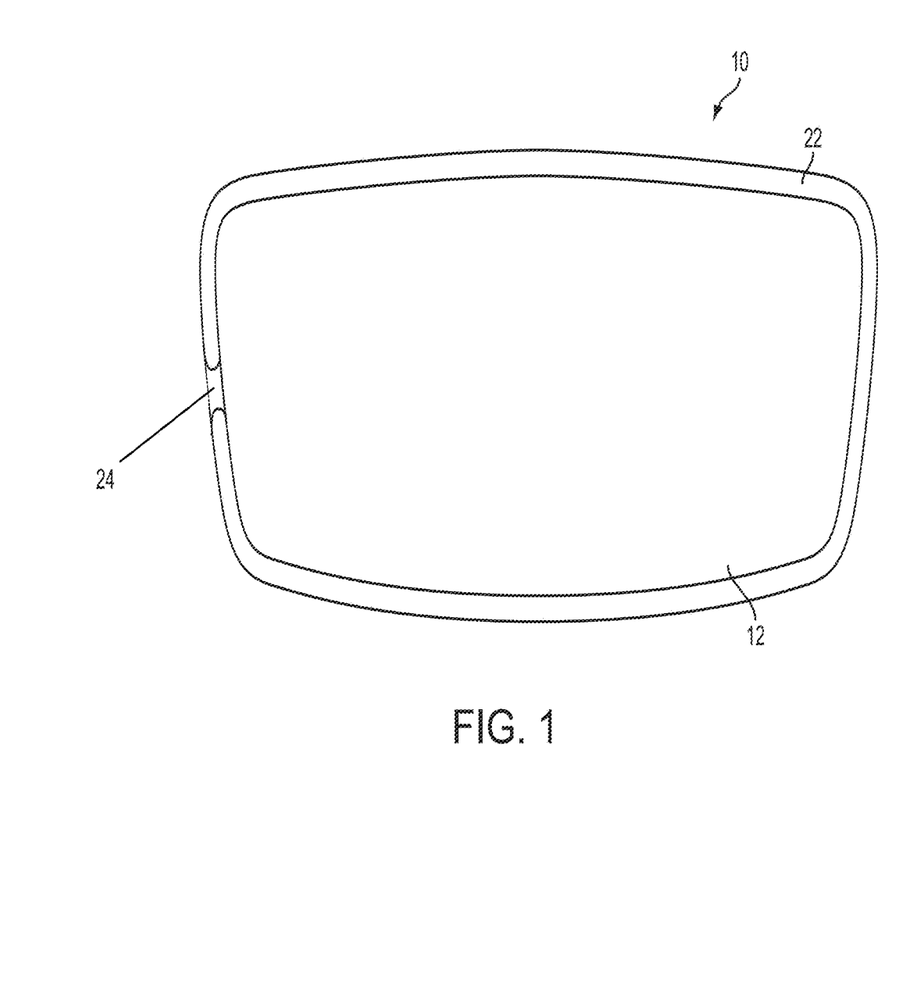
FIG. 1 is a plan view of a reflective element or cell with fill port for filling the reflective element or cell in accordance with the present invention.
Figure 2:
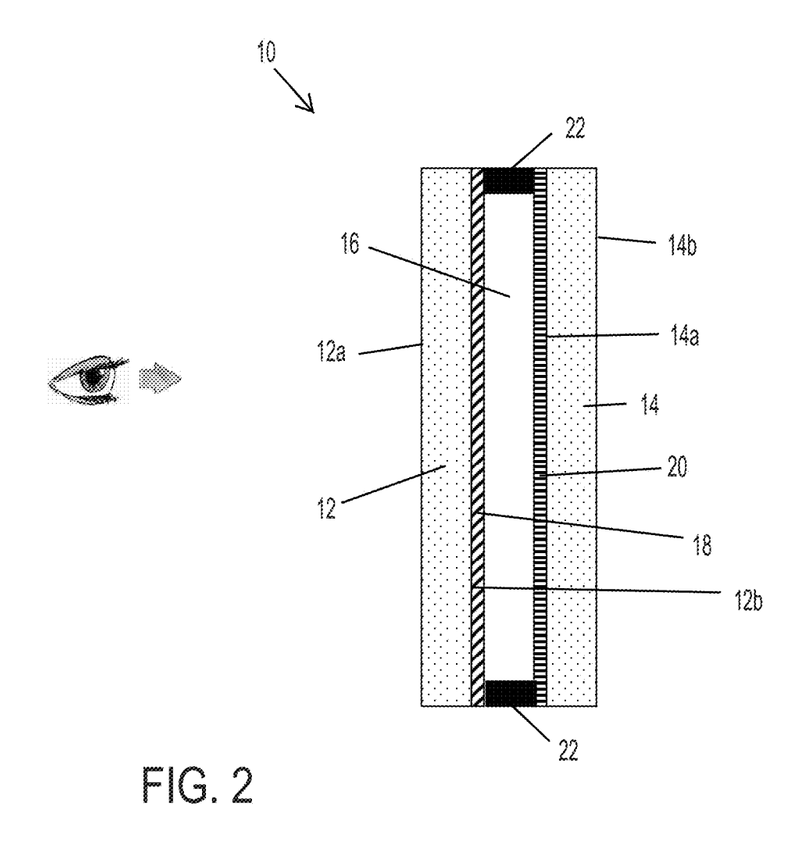
FIG. 2 is a sectional view of the reflective element or cell of FIG. 1.

Referring now to the drawings and the illustrative embodiments depicted therein, an electro-optic mirror reflective element assembly or cell 10 (such as an electrochromic mirror reflective element or cell) for an interior or exterior rearview mirror assembly of a vehicle includes a first or front substrate or glass element 12 and a second or rear substrate or glass element 14 (FIGS. 1 and 2). The rear reflective element substrate 14 is spaced from front reflective element substrate 12, and the cell includes an electro-optic medium, such as an electrolyte or monomer composition or electrochromic medium or the like, sandwiched between the substrates 12, 14 and in contact with conductive or semi-conductive layers 18, 20 (described below) established at the cavity facing surfaces 12b, 14a of the front and rear substrates 12, 14, respectively. A perimeter seal 22 (such as an epoxy seal material or the like) is applied between the substrates to establish the cavity for the electrochromic medium and to adhere the substrates together. The perimeter seal 22 includes a fill port 24 to flow the EC medium into the interpane cavity during the filling process that fills the cavity with the electro-optic medium 16, as discussed below. The formed electrochromic mirror cells are shaped for utilization in a complete automotive electrochromic rearview mirror assembly, such as the types described in U.S. Pat. Nos. 6,595,649; 6,648,477; 6,154,306; 5,610,756; 5,406,414 and/ or 5,253,109, which are hereby incorporated herein by reference in their entireties.

As shown in FIG. 2, the reflective element assembly or cell 10 includes front substrate 12 and rear substrate 14, with the electro-optic medium 16 (such as an electrochromic medium) disposed therebetween (and sealed or contained within the interpane cavity between the glass substrates 12, 14 via the perimeter seal 22). The front substrate 12 has a front or first surface 12a (that faces generally towards a driver of a vehicle when the mirror assembly is normally mounted in the vehicle) and a rear or second surface 12b, with a transparent conductive coating 18 (such as an indium tin oxide (ITO) coating or the like) established at second surface 12b, while the rear substrate 14 has a front or third surface 14a (facing the interpane cavity and electro-optic medium disposed between the front and rear substrates) and a rear or fourth surface 14b, with a metallic reflector coating 20 (such as a transflective display-on-demand reflector coating that is partially transmissive of light therethrough and partially reflective of light incident thereon) established at third surface 14a.

Mirror reflective elements or cells are filled under vacuum with no back pressure or pressurizing of the filling chamber so no polymethylmethacrylate (PMMA) beads are needed (since there is no inward pressure on the substrates that may lead to collapsing of the cell due to the pressure differential that occurs between the filling chamber and the interpane cavity during known vacuum filling processes). There is no change in DI after fill due to pressure differential on the cell. By switching to a fill process that does not require PMMA beads, the potential benefits may be substantial. Some of these benefits are obvious and some indirect benefits may be even more significant, such as reducing the thickness of the conductive coatings on the second and third surfaces. This is possible because the increase in the cell gap (interpane spacing) then becomes significantly easier without the use of PMMA beads. This increase in cell gap can compensate for less conductive coatings.

For smaller sized mirror reflective elements, such as for interior rearview mirror assemblies, such beads may not be needed during the conventional or known vacuum filling processes. However, for larger sized mirror reflective elements, such as for many exterior rearview mirror assemblies, beads are typically required to limit or avoid collapsing of the cell during the application of the pressure differential between the pressurized chamber and the vacuumed interpane cavity.

The present invention provides a gravity fill (or slightly pressurized fill) process where the electrochromic fluid is filled into the interpane cavity through the fill port that, during the filling process, is positioned at an upper end of the cell. The interpane cavity to be filled does not include any beads (however, beads may still be used in the seal material to establish the desired interpane spacing between the glass substrates), because the filling process is done without pressurizing the filling chamber (or venting the chamber to atmosphere), so there is no pressure differential (or little pressure differential) created between the vacuumed and empty interpane cavity and the chamber that houses the cell during the filling process. The empty cell is placed in a filling chamber (such as at a fixture where a filling crucible is disposed at an upper portion of the cell where the fill port is located) so that the inside of the cell is vacuum and outside of the cell is vacuum. The electrochromic fluid is then provided at the fill port and poured into the vacuumed interpane cavity. Because such a gravity feed is slow, the fluid supply may be slightly pressurized to increase the fill speed (such as by slightly pressurizing the line that feeds the fluid to the crucible). During the gravity filling process, the glass substrates may flex or bow outwards as the cell cavity is filled with fluid (with the pressurized filling process, there may more of a pressure differential between the interpane cavity of the cell and the filling chamber), whereby the filled cell may require further processing to correct for any double image (DI) of the filled (or slightly overfilled) cell (where a double image may occur due to the glass substrates being non-flat or non-parallel to one another, such as when one or both substrates bows inward or outward relative to the interpane cavity), as discussed below.

Filling from the top of the cell in accordance with the present invention may utilize a crucible that seals at the cell to limit leaking of fluid during the gravity filling (or slightly pressurized filling) of the cell cavity. Optionally, for example, the crucible may be coupled to the cell (at the fill port) with a soft silicone gasket or seal or the like. The electrochromic fluid flows into the cell without any pressure outside of the cell, so no plastic beads are needed inside the cell. After the cell is filled, the filling chamber may be pressurized or vented to atmosphere, whereby there is no pressure differential at the fill port and at the glass substrates of the filled cell.

During the top fill process of the present invention, the cells are filled in a chamber, with the center region of the cells bulging slightly outward during the filling process instead of slightly collapsing inward. Thus, in the top fill process, the cells may have some DI, but the DI is not due to the cell collapsing but actually is because the cell has expanded as it is filled. The DI can be corrected either inside or outside of the filling chamber and via any suitable means, such as by removing the filled (and slightly expanded) cell from the chamber and laying it flat on one substrate or side so that any excess fluid in the cell naturally comes out of the cell. This outflow of fluid is due to the weight of the fluid and the weight of the glass.

When a cell is filled from the top, the cell naturally expands as the fluid flows into the cell cavity. This happens again due to the weight of the fluid and the flexibility in the glass and the height of the mirror. This may be a greater problem when the glass substrates are thinner and less of a problem when the glass substrates are thicker.

Figure 3:
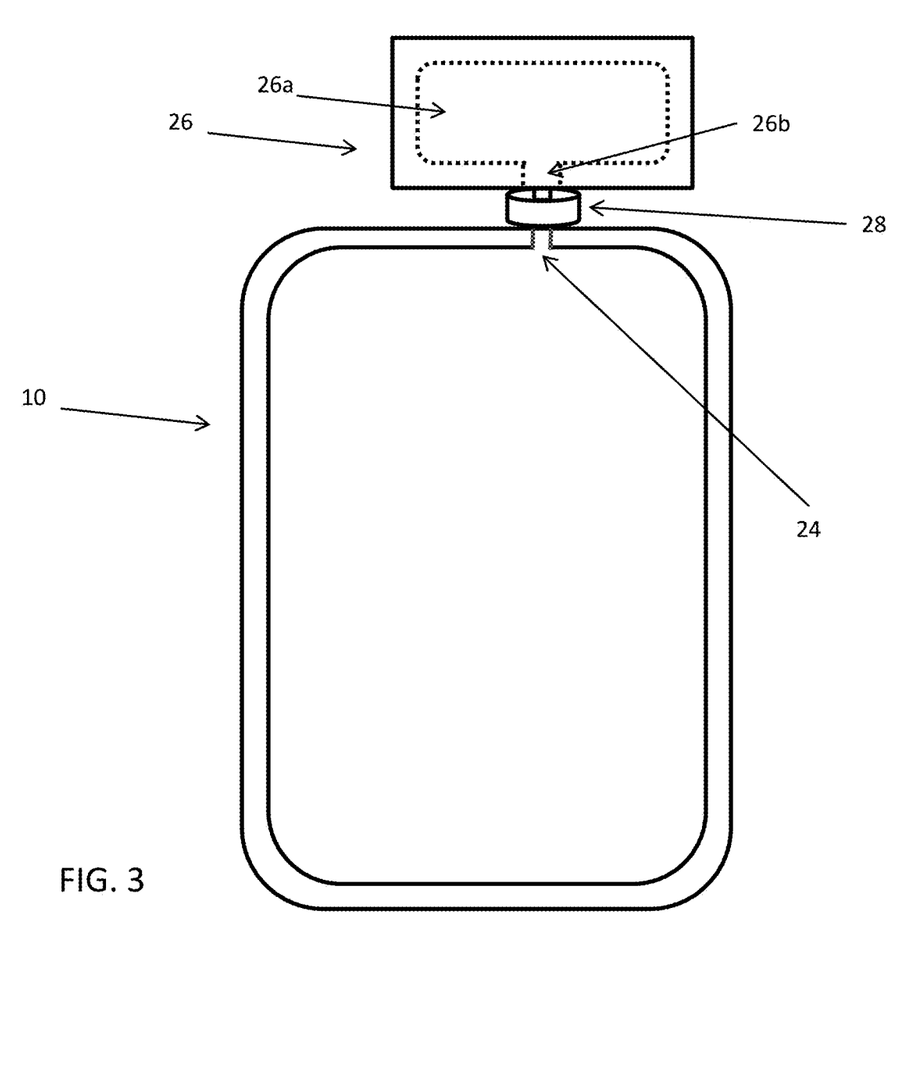
FIG. 3 is a perspective view of a cell filling fixture with a gravity fed crucible for top filling of the reflective element cell in accordance with the present invention.

For example, and as shown in FIG. 3, an electrochromic reflective element 10 may have a fill port 24, whereby a crucible 26, such as a gravity fill crucible, is disposed at the fill port 24, with the fill port and crucible being positioned at an uppermost portion of the reflective element or cell during the filling process. A soft gasket 28 is provided between the crucible or filling element 26 and the reflective element 10, and seals the outlet port of the crucible relative to the fill port of the reflective element, whereby fluid provided in the reservoir 26a of the crucible 26 flows through the outlet port 26b of the crucible and through the passageway of the gasket 28 and into the fill port 24 of the reflective element 10 and into the interpane cavity of the reflective element to fill the cell or element with the electrochromic medium or fluid.

Figure 4:
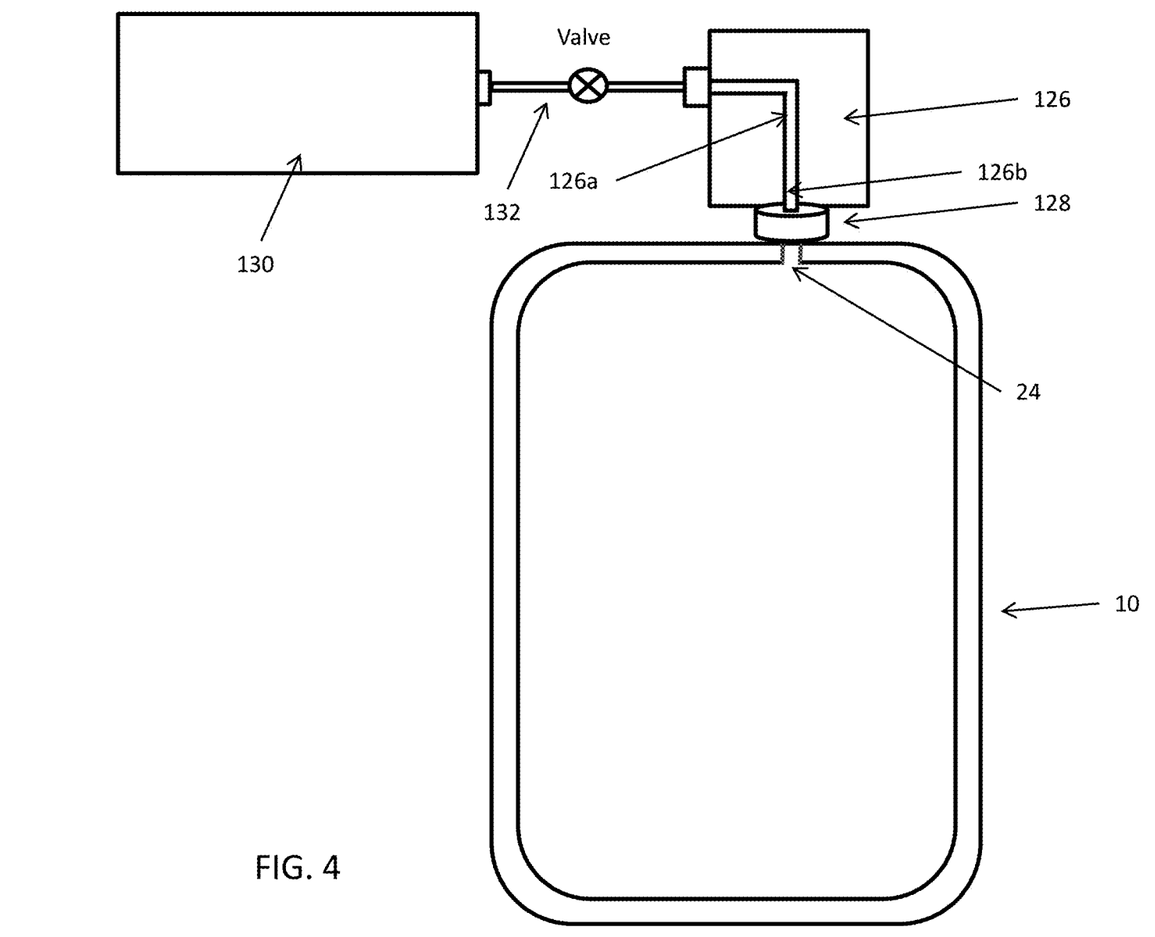
FIG. 4 shows views of a crucible for pressurized filling of the reflective element or cell in accordance with the present invention.

Optionally, and as shown in FIG. 4, an electrochromic reflective element 10 may have a fill port 24, whereby a pressure fill crucible 126 is disposed at the fill port 24, where the fill port and crucible may be positioned at an uppermost portion of the reflective element or cell during the filling process. A soft gasket 128 is provided between the crucible or filling element 126 and the reflective element 10, and seals the outlet port of the crucible relative to the fill port of the reflective element. During the slightly pressurized filling process, fluid is provided from a pressurized fluid reservoir 130 to a tubing 132 (which may have a valve or the like to open and close the tubing), which is connected to a passageway 126a of the crucible 126, such that the fluid flows through the tubing 132 and through the passageway 126a to the outlet port 126b of the crucible and through the passageway of the gasket 128 and into the fill port 24 of the reflective element 10 and into the interpane cavity of the reflective element to fill the cell or element with the electrochromic medium or fluid.

Because beads are not needed in the interpane cavity of the cell that is being filled, the filling process of the present invention is capable of filling larger sized cells, such as larger cells for larger exterior rearview mirror assemblies or even larger electrochromic windows or sunroofs or the like, such as electro-optic or electrochromic windows for vehicles or aircraft or the like. Also, because beads are not included in the interpane cavity, the filled cell does not need the heating process to dissolve such beads, as is typically required in conventional cell manufacturing processes. The present invention is thus suitable for larger area electro-optic reflective element cells, such as cells having an electrochromically active surface area of at least about 130 m$^2$ or thereabouts. Also, or otherwise, the present invention is suitable for electro-optic reflective element cells having thicker interpane spacings, such as interpane spacings or gaps greater than about 125 microns, more preferably greater than about 150 microns, and more preferably greater than about 175 microns or thereabouts.

Because beads are not included in the interpane cavity, the substrates, when mated together and adhered together via the perimeter seal, may be pressed together only along the seal or periphery of the cell, in order to avoid pressure being applied at the substrates at the interpane cavity region. This process is applicable to making flat and convex and aspheric mirror reflective elements. The removal of PMMA beads (or the non-inclusion of such beads) results in the desire or need to apply pressure at the substrates at and along the seal only. When beads are present, the entire mirror surface can be put under pressure. However, with no PMMA beads present in the interpane cavity, the pressure would only need to be put on the perimeter of the cell so as to avoid collapsing the center of the mirror reflective element while the perimeter seal cures. After the seal is cured, the empty cell is then filled via the gravity or pressure fill process described herein.

Because there is no pressure differential applied to the glass during the filling process of the present invention, the glass substrates may be thinner (as compared to glass substrates of similar sized reflective elements formed via conventional processes). Moreover, when making larger cells, the conductive coatings typically have to be disposed as thicker coatings or have to comprise higher conductivity materials to achieve uniform coloring of the cell. However, because the filling process of the present invention does not include interpane cavity beads and does not include a pressure differential at the glass substrates of the empty cell (and because the substrates may be mated together and the seal cured without pressure against the substrates inboard of the seal), the cells can be made with a larger interpane gap or spacing, such that the electrochromic medium disposed in the interpane cavity may be thicker, which results in enhanced coloring and/or more uniform coloring of the electrochromic medium (when the medium is darkened or colored or energized). Such an approach may allow the conductive coatings at the surfaces of the glass substrates to be substantially thinner and/or to comprise a lower conductivity material. The additional fluid used to fill the larger cavity costs little compared to the potential savings in the material costs and in the reduction in thickness of the conductive coatings.

The gravity or slight pressure filling process of the present invention thus makes the filling of cells easier, and provides for enhanced plugging of the fill port after the cell is filled. This is because the fluid provided at the fill port is controlled or supplied in a controlled manner, such that the correct amount is provided in the cell and subsequent filling of the fill port is limited or substantially precluded. Also, when filling the cell from the top, there is a significant reduction in waste of electrochromic fluid. Moreover, because the fluid dispensed from the top of the cell does not come into contact with the face of the mirror cell, the present invention eliminates the need for a cleaning step to remove fluid from the outer glass surfaces after the filling process, as is typically required during conventional vacuum filling processes.

As discussed above, for a gravity feed filling process, the fill cavity can be positioned vertically such that the fill port is pointing up (or at the uppermost portion of the fixtured element or cell). However, with the forced filling or pressurized filling, the interpane cavity and reflective element can be arranged or fixtured in any orientation. This can be done since there is a positive seal against the edge of the mirror substrates and arranging the entire system in a horizontal position would not affect the fill process. Optionally, it may be advantageous to fixture the cell in a horizontal or flat orientation, since the weight of the fluid filling the cavity would not cause the mirror glass substrates to bulge out as it may when the mirror is held in a vertical position. Optionally, the fixtured mirror may be held at an angle (such as, for example, about a 45 degree angle or thereabouts), such that, if the fluid ever drips after the crucible is taken off the filled mirror element, the fluid will not drip onto the face of the filled mirror reflective element.

Thus, the potential benefits of the mirror reflective element or cell or process of the present invention include:
Improved DI (cells are filled with little or no pressure differential);
No clumping or stacking beads which means improved DI;
No sieving or dispensing of PMMA beads;
Improved cleanliness in the clean room;
Improved cleanliness in the fill process (reduced concerns about debris falling off the cells into the crucible since the cells are being filled from the top; optionally, a filter may be incorporated into the crucible);
No bead residue which can remain in the mirror if the beads do not fully dissolve;
No oven bake because there are no beads in the filled cavity to dissolve (parts can be made to cure as inside mirrors);

The possibility of shipping uncured parts will go down, which means reduced concerns about seal damage at the assembly plants when the parts are assembled into the mirror housings;

Parts can be blown off with $N_2$ just prior to mating which cannot be done when PMMA beads are present;

More glass can be discarded further upstream since in the absence of beads, glass defects are easier to see;

Parts with bubbles can be topped up again in the second fill cycle (they do not have to be discarded);

The mirror reflective elements can have a thicker cell gap and have less conductive coatings thus reducing the associated cost of conductive coatings; and/or The switch to thinner coatings has its own range of benefits (more uptime, less PM on the coater and/or the like).

Figure 5:
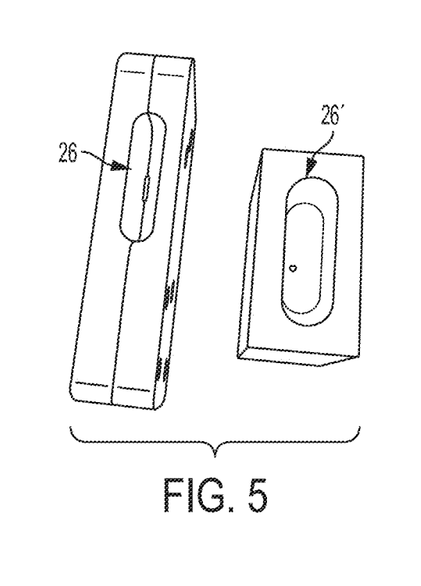
FIG. 5 shows top views of crucibles for filling of the reflective element or cell in accordance with the present invention.

As shown in FIGS. 3-5, example crucibles for filling cells from the top may include the different styles of crucibles shown in FIGS. 3-6. Some (such as crucibles 26 and 26') are for gravity fed filling (FIGS. 3, 5 and 6) and one can be pressurized (such as crucible 126 of FIG. 4). The mirror reflective elements can be filled with gravity alone but the fill can take anywhere from five minutes to ten minutes for larger cells. Increasing the cell gap would help but the gravity feed would require a batch filling system. The same overall cycle time may then be achieved since venting can be done faster. Optionally, the present invention provides a crucible (FIG. 4) where the fluid can be slightly pressurized.

Figure 6:
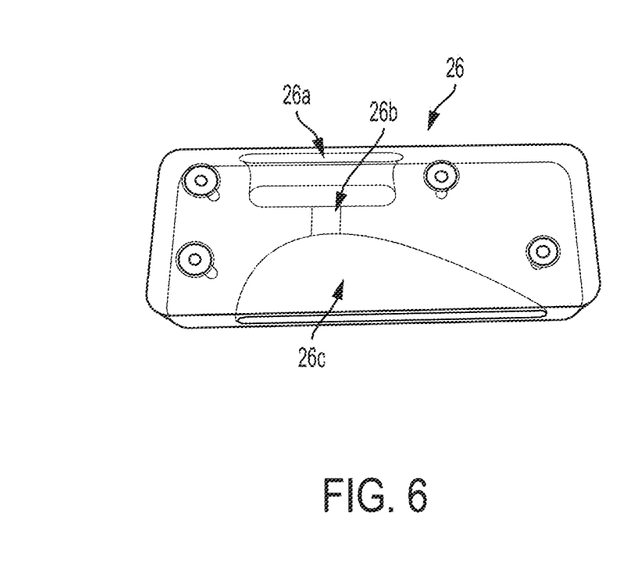
FIG. 6 shows a side view of a gravity fed crucible showing the reservoir and a cell engaging portion that partially receives a portion of the electro-optic cell therein during the filling process.

The crucibles are capable of filling cells from the top of the cell with no PMMA beads inside the cell. As shown in FIG. 6, the crucible 26 includes a channel or outlet port 26b connecting the top reservoir 26a to the fill port of the reflective element, which may be partially received in a receiving portion 26c of the crucible 26. A soft gasket is applied to the cell and is disposable but it could be built into the crucible (such as at or in the receiving portion 26c). This significantly reduces the fill time from about ten minutes to about two to three minutes. Optionally, the crucible may be made with Teflon.

The present invention provides a process of manufacturing a reflective element or cell that has a seal on the thinnest mirror (which is about 3.3 mm thick) and where the fluid can be slightly pressurized to improve the fill cycle.

Optionally, the fill time can be improved to the point where the fill process may be a one piece fill process (where a single cell is placed in a smaller vacuum chamber and filled). Also, the system may include a lift mechanism at the fixture such that the system can make and break the seal (between the crucible and the cell) under vacuum. In the illustrated embodiment of FIG. 4, the electrochromic fluid or medium is pumped down into the cell via the attached tubing that flows from a fluid reservoir (under pressure) through a valve and through a crucible that is sealed at the fill port of the electrochromic cell via a sealing element or soft gasket (with a hole therethrough). The gasket seals the crucible relative to the electrochromic cell and allows fluid flow from the tubing or crucible through a passageway or hole of the gasket and into the fill port and cell. The fill tube thus attaches to the crucible, which presses against the gasket at the edge of the cell to allow for pressurization of the fluid during the filling process. This slight pressure on the fluid improves the fill cycle time.

The rear or second surface 12b of front substrate 12 may include one or more transparent electrically conductive layers (such as an indium tin oxide (ITO) layer, or a doped indium tin oxide layer or any other transparent electrically semi-conductive layer or coating or the like (such as indium cerium oxide (ICO), indium tungsten oxide (IWO), or indium oxide (IO) layers or the like or a zinc oxide layer or coating, or a zinc oxide coating or the like doped with aluminum or other metallic materials, such as silver or gold or the like, or other oxides doped with a suitable metallic material or the like, or such as disclosed in U.S. Pat. No. 7,274,501, which is hereby incorporated herein by reference in its entirety) thereat. The coated rear surface 12b defines the active EC area 12c of the front substrate within the perimeter seal 22. The front or third surface 14a may include one or more transparent semi-conductive layers (such as an ITO layer or the like), and/or one or more metallic electrically conductive layers (such as a layer of silver, aluminum, chromium or the like or an alloy thereof), and may include multiple layers such as disclosed in U.S. Pat. Nos. 7,274,501; 7,184,190 and/or 7,255,451, which are hereby incorporated herein by reference in their entireties. The reflective element assembly 10 thus may comprise a third surface transflective element assembly or cell, whereby the reflective layer or surface is disposed at the third surface of the cell or at the front surface of the rear reflective element substrate for viewing by a driver of the vehicle. The third surface 14a defines the active EC area or surface of the rear substrate within the perimeter seal 22. The coated third surface 14a may also be coated to define a tab-out region (such as by utilizing aspects of the mirror assemblies described in U.S. Pat. Nos. 7,274,501; 7,184,190 and/or 7,255,451, which are hereby incorporated herein by reference in their entireties) for providing electrical connection of the conductive layers 20 to an electrical clip of connector or bus-bar, such as the types described in U.S. Pat. Nos. 5,066,112 and 6,449,082, which are hereby incorporated herein by reference in their entireties.

Optionally, the reflective element may include a metallic perimeter band 28 around the perimeter of the reflective element, such as by utilizing aspects of the reflective elements described in U.S. Pat. Nos. 7,626,749; 7,274,501; 7,184,190 and/or 7,255,451, and/or U.S. Publication No. 2006-0061008, which are hereby incorporated herein by reference in their entireties. Optionally, the perimeter band may comprise a chrome/chromium coating or metallic coating and may comprise a chrome/chromium or metallic coating that has a reduced reflectance, such as by using an oxidized chrome coating or chromium oxide coating or "black chrome" coating or the like (such as by utilizing aspects of the mirror assemblies described in U.S. Pat. Nos. 7,184,190 and/or 7,255,451, which are hereby incorporated herein by reference in their entireties). Optionally, the mirror reflective element may comprise a frameless reflective element (such as a frameless exterior mirror assembly or a frameless interior mirror assembly), such as by utilizing aspects of the reflective elements described in U.S. Pat. Nos. 7,626,749; 7,360,932; 7,289,037; 7,255,451; 7,274,501 and/or 7,184,190, and/or U.S. Publication Nos. 2006-0061008 and/or 2006-0050018, which are hereby incorporated herein by reference in their entireties. Optionally, the reflective element may comprise a frameless reflective element, such as the types marketed as a prismatic or electrochromic INFINITY™ mirror, such as are shown and/or described in U.S. Des. Pat. Nos. D633,423; D633,019; D638,761 and/or D647,017, and/or International Publication Nos. WO 2013/071070; WO 2012/051500; WO 2010/124064 and/or WO 2011/044312, and/or U.S. Pat. Nos. 7,253,723 and/or 8,154,418, which are hereby incorporated herein by reference in their entireties.

As is known in the art, the perimeter seal material 22 is established around the periphery of one of the substrates 12, 14, such as around the periphery of the rear substrate 14, and circumscribes the substrate surface (such as the front surface 14a of the rear substrate). The perimeter seal 22 may be dispensed with spacing elements (such as glass beads or the like) that establish and maintain the desired or appropriate gap between the substrates 12, 14 when the substrates are mated together so that the interpane cavity has a generally or substantially uniform thickness or gap across the mirror reflective element assembly or cell 10. The perimeter seal 22 and spacing elements are disposed or dispensed around the substrate surface and the seal material 22 has a gap 24 between opposed terminal ends of the perimeter seal to establish the fill port for filling the interpane cavity with the electro-optic medium. The fill port may include a filter of the types described in U.S. Publication No. US-2011-0299170, which is hereby incorporated herein by reference in its entirety.

The empty mirror cell may be filled as described above and the fill process may include aspects of other interpane cavity filling processes or means, and may utilize aspects of the assemblies and systems described in U.S. Pat. No. 5,140,455, which is hereby incorporated herein by reference in its entirety. For example, in the filling or backfilling process, the empty cell is placed in a vacuum chamber along with a container or crucible containing or connected to a supply of the electro-optic medium fluid (such as electro-chemichromic fluid or the like) that is intended to be filled through the single fill hole or port into the cell cavity. The chamber is evacuated to a high vacuum, such as 1 mm Hg or better. The cell is placed at the crucible and the fluid is supplied to the fill port at the upper end of the fixtured cell to fill the cell with the electro-optic medium fluid. After the cell cavity is filled, the fill port is plugged or sealed, such as via a plugging process, where an epoxy or other suitable material (such as a suitable UV curable adhesive or the like) is established at and in the fill port and cured to seal the fill port and seal the fluid within the interpane cavity.

In addition to filling under vacuum, the part can also be plugged under vacuum. Also, because the plugging can be done under vacuum, the plug can also be cured under vacuum. Thus, the part can go into a chamber as an empty cell and come out as a filled and plugged cell. The process of injecting the plug seal into the fill port may be the same as injecting SPM or electrochromic fluid into the mirror cell. This means there could be two dispensing heads in the fill chamber. One that feeds the fluid into the mirror cavity and the other that feeds in the plug seal after the cavity is filled with fluid. The curing of the plug may be done using a fiber optic cable and a UV light source or the like. The coupling from outside the chamber to inside the vacuum chamber may be done using a quartz rod and conventional vacuum fittings or the like.

Therefore, the present invention provides a top-fill of a mirror reflective element or cell that does not include establishing a pressure differential between the interpane cavity of the cell and the chamber at which the cell is positioned for filling. The method of making or forming the reflective element assemblies in accordance with the present invention includes providing a substrate and establishing or dispensing a perimeter seal material along the periphery of a surface of the substrate to substantially circumscribe the perimeter region of the substrate surface, with a gap between opposed terminal ends of the seal material. For example, an uncured adhesive seal material, such as an uncured epoxy material or the like, may be applied to the surface of the substrate (such as, for example, the rear substrate of the mirror cell) along the perimeter region of the surface of the mirror shape or substrate. The other substrate (such as, for example, the front cut shape or substrate) is superimposed upon the rear substrate and spaced therefrom by the applied uncured material (with spacing elements or beads disposed therein) and is mated with the first substrate to assemble the substrates together. The uncured adhesive material is then cured, such as by heating, to adhere the shapes or substrates together and to space the glass sheets or substrates apart a desired amount to define the appropriate interpane cavity or spacing. An electrolyte or monomer composition is then filled into the interpane cavity or cavities via the fill port provided in the perimeter material or seal, such as via a gravity fill or slightly pressurized fill process. Optionally, aspects of the present invention may be suitable for application to other devices or cells with filled interpane cavities, such as, for example, display elements or devices (such as liquid crystal display (LCD) devices or backlit thin film transistor (TFT) and/or the like.

As discussed above, the rearview mirror reflective element assembly of the present invention comprises an electro-optic or electrochromic reflective element assembly or cell, such as an electrochromic mirror reflective element assembly with coated substrates that are coated utilizing principles disclosed in commonly assigned U.S. Pat. Nos. 7,310,178; 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference in their entireties, and/or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS., Optical Engineering Press, Wash. (1990), which are hereby incorporated by reference herein in their entireties. Optionally, the electrochromic circuitry and/or a glare sensor (such as a rearward facing glare sensor that receives light from rearward of the mirror assembly and vehicle through a port or opening along the casing and/or bezel portion and/or reflective element of the mirror assembly) and circuitry and/or an ambient light sensor and circuitry may be provided on one or more circuit boards of the mirror assembly that receives or incorporates the mirror reflective element assembly or cell constructed in accordance with the present invention.

Although such transflective reflective element assemblies are capable of transmitting the illumination or display information through the assembly, it is sometimes desirable to provide a window in the metallic reflective coating through which the display information or illumination may be transmitted. Typically, such windows in the reflective coating of transflective reflective element assemblies are desirable for a glare sensor (such as a photo sensor or the like, such as a glare sensor and/or an ambient light sensor and electrochromic automatic dimming circuitry described in U.S. Pat. Nos. 4,793,690; 5,193,029 and/or 7,004,593, which are all hereby incorporated herein by reference in their entireties) or the like to be positioned at, in order to allow substantial transmission of light from the rear of the mirror assembly or vehicle through the reflective element assembly to the glare sensor positioned within the mirror assembly. The sensors may comprise glare sensors or photo sensors (such as sensors of the types described in U.S. Pat. Nos. 4,793,690;

5,193,029 and/or. 7,004,593, which are all hereby incorporated herein by reference in their entireties), or touch or proximity sensors (such as the sensors of the types described in U.S. Pat. No. 7,249,860, which is hereby incorporated herein by reference in its entirety).

Typically, the material for the substrates comprises glass, such as soda-lime glass or the like, but other materials, such as polycarbonate or other polymeric materials may be utilized without affecting the scope of the present invention. The completed mirror cells or reflective element assemblies include a front substrate and a rear substrate. The rear substrate may have a reflective coating on its front surface (toward the front substrate when the substrates are sandwiched together, and typically referred to as the third surface of the mirror reflective element assembly), while the front substrate may have a transparent semiconductive coating, such as a coating of indium tin oxide (ITO) or doped indium tin oxide or the like, on its rear surface (toward the rear substrate when the substrates are sandwiched together, and typically referred to as the second surface of the mirror reflective element assembly).

Although shown as having generally flush edges, the cells manufactured by the process of the present invention may have generally or substantially flush edges or offset edges or overhang regions or the like, while remaining within the spirit and scope of the present invention, such as the types of cells described in U.S. Pat. Nos. 7,274,501; 7,184,190 and/or 7,255,451, which are hereby incorporated herein by reference in their entireties, or may have other forms or shapes, such as the mirror shapes described in U.S. Pat. No. 7,110,156, and/or shown in U.S. Design Pat. Nos. D493,131 and/or D493,394, which are hereby incorporated by reference in their entireties.

The method of the present invention provides an enhanced assembly process for manufacturing an electrochromic mirror reflective element cell assembly, such as the type shown in FIGS. 1 and 2 and described above. The method or process may clean and coat individual cut glass shapes or a large sheet of glass (such as soda lime glass or other material, such as polycarbonate or the like) and adheres coated sheets of glass together (or adheres coated substrates to a sheet of multiple mirror shapes) before the shapes or substrates or cells are scribed and broken out or cut from the sheet or sheets, such as by utilizing aspects of the mirror assembly processes described in U.S. Pat. No. 7,255,451, which is hereby incorporated herein by reference in its entirety.

After the coating (and laser etching if applicable) processes, the glass sheet or substrate is conveyed or moved to a dispensing process or dispenser, where an uncured adhesive material, such as an epoxy seal material, may be dispensed onto the pristine coated and cleaned surface of the substrate. The sheet or substrate may be positioned at an appropriate location in response to a computer aided camera or vision or imaging system detecting the register marks and the conveyor or automated or computer controlled robot or robotic arm or the like positioning the sheet to align the register marks with a predetermined location. The fixturing and dispensing machine may find the register marks and may dispense the uncured seal material in the desired location and shape based on the marks. The uncured seal material (and spacer beads or the like, such as glass beads or the like, as is known in the mirror art) thus may be dispensed onto the sheet or substrate or mirror shape. The seal material, when cured, forms the cavity boundary for a plurality of cells or mirror shapes.

Optionally, while the seal material mirror shapes are dispensed or after the seal material mirror shapes are dispensed, a plurality of portions of adhesive, such as drops or spots or segments of a UV curable adhesive or the like, may be applied on the surface of the sheet (such as by an adhesive dispenser) at areas outside of the seal material mirror shapes. The portions may be dispensed or applied by the same dispensing machine or by another dispenser, without affecting the scope of the present invention. The UV curable adhesive portions may be quickly cured (after the substrates are mated together, as discussed below) via exposure to UV light or via heat to adhesively secure the sheets together, as described below. The UV curable adhesive may serve to hold the substrates together until the epoxy seals are cured.

After the seal material (and optionally adhesive drops and a fill port filter material) are dispensed onto or disposed at the surface of the sheet or substrate, the sheet or substrate is conveyed or moved to a coupling or mating station, where the front glass sheet or substrate is positioned at and placed onto the rear sheet or substrate, such as via an automated or computer controlled robot or robotic arm or the like. The front sheet or substrate may be processed in a similar manner as described above for the rear sheet or substrate, or may be supplied to the mirror manufacturer as pre-coated sheets or pre-coated and pre-cut substrates, without affecting the scope of the present invention. The front sheet or substrate is cleaned and washed prior to coupling the sheet or substrate with the rear sheet or substrate, so that the pristine surface of the front sheet or substrate is clean and free of debris and the like when the cell is assembled.

For example, the substrate surface of the front and/or rear substrates may be initially coated with a transparent electrically conductive coating, such as a low cost tin oxide coating or the like, such as the types described in U.S. Pat. Nos. 6,420,036; 6,245,262; 6,154,306 and/or 5,724,187, which are hereby incorporated herein by reference in their entireties. For example, a mirror assembly manufacturer may purchase tin oxide-coated glass substrates or sheets, such as sold by the LOF Glass division of Libbey-Owens-Ford Co., Toledo, Ohio under the trade name of "TEC-Glass" products, such as "TEC 10" (10 ohms per square sheet resistance), "TEC 12" (12 ohms per square sheet resistance), "TEC 15" (15 ohms per square sheet resistance) and "TEC 20" (20 ohms per square sheet resistance) tin oxide-coated glass and the like. Moreover, tin oxide coated glass substrates, such as commercially available from Pittsburgh Plate Glass Industries, Pittsburgh, Pa. under the "SUNGATE" trade name, may be advantageously employed herein.

The rear sheet or substrate may be positioned at an appropriate location (such as via the conveyor or an automated or computer controlled robot or robotic arm or the like) in response to identification/recognition (such as by a computer aided camera vision or imaging system) of register marks or the like formed in the coated surface or via identification/recognition of the edges of the cut and coated substrate. The front sheet or substrate (with the ITO layer or the like applied to its surface) may be supplied to the coupling station from the washer, such that the front sheet or substrate is cleaned just prior to the coupling of the sheets together. The clean front sheet or substrate is then positioned relative to the rear sheet or substrate and the epoxy seal, and may be pressed into engagement with the epoxy seals and UV curable glue dots. The sheets or substrates may be positioned relative to one another in response to detection of the register marks on one or both sheets or substrates and/or by the detection of the edges or other characteristics or physical attributes of the front sheet or substrate, such as detection of flat portions or edges along the front shapes, such as by a computer aided camera vision or imaging system or the like. The automated robot may substantially uniformly press the sheets together, whereby the epoxy seal material (and spacing elements or beads) provides the appropriate spacing between the sheets or substrates and defines the cell cavity. The UV curable glue dots may be cured (such as by exposure to UV light and/or heat or other means for curing the quick curing adhesive) while the sheets or substrates are pressed and held together at the desired spacing (as provided by the spacer beads or the like in the epoxy seal), such that the sheets or substrates are held at the appropriate spacing. The assembled cell may then be conveyed to a checking station to check the seal width and interpane cavity spacing and plug opening or fill port of the mirror cell.

While the front shapes are pressed against the uncured seal material, a quick curing adhesive, such as UV curable adhesive or the like, may be applied in portions around or partially around or spaced around the perimeter of the shape and between the front shape and the rear shape (and outside the perimeter seal material), and may be quickly cured (such as by exposure to UV light following the application of the adhesive). The UV curable adhesive may be applied and cured to each shape separately as the shape is juxtaposed and superimposed on the respective seal material of the rear sheet, or may be applied and cured after the shape or substrate is juxtaposed and superimposed on the respective seal material shapes of the rear sheet or substrate. For example, the UV curable adhesive may be applied in spots or dots around the perimeter of a substrate, and a UV curing device may follow the adhesive dispenser or applicator and may emit UV light soon or substantially immediately after the dots are applied to cure the UV curable adhesive and, thus, adhere the respective shape or substrate to the rear shape or substrate. The sandwiched shapes may then be conveyed to the checking station to check the seal width and interpane cavity spacing and plug openings.

The sandwich of substrates may then be moved to a curing oven or fixture, which cures the epoxy seal material in a known manner, such as heat curing at approximately 150 degrees C. or via other processes. After the seal material is cured, the empty cell may then be filled, such as with an electrolyte or monomer composition, and plugged at a filling station (such as a vacuum filling station) such as described above. The mirror cells may be loaded into the vacuum fill chamber and filled and then removed and conveyed to a plugging station, where an operator may remove the mirror cell and plug the fill hole with a plug, such as a UV curable adhesive or glue or the like. Optionally, the gap or fill port may be plugged with a non-conductive seal or plug material, such as a UV curable or heat curable seal or plug material (such as described in U.S. Pat. Nos. 6,207,083; 5,724,187; 5,233,461 and/or 5,142,407, which are hereby incorporated herein by reference in their entireties), to substantially seal the cell. After the hole is plugged, the cell is conveyed through a UV curing area which may emit UV light or radiation or energy to cure the UV curable adhesive plug, and may then be conveyed to a cleaning station, where the cell is cleaned.

Optionally, the filled and plugged and cured cell may then receive an electrode clip, which may be glued to the cell with a UV curable adhesive at a gluing station, and then may be conveyed to a UV curing area to cure the UV curable adhesive to adhere the clip to the cell. Optionally, the cell may then be conveyed to a soldering station, where a wire harness may be soldered to the electrode clip at the soldering station in a known manner to complete the cell manufacturing. Optionally, a tab-out area and the electrode clips of the rear substrate may then be encapsulated via known means at a tab-out coating/curing station.

The process of the present invention is equally suited for interior or exterior reflective element assemblies, and for flat substrates or convex or curved substrates or the like. Also, the process of the present invention is suited for other electro-optic or electrochromic elements or cells, such as electro-optic windows or sunroofs or the like, having two spaced apart glass substrates that define an interpane cavity bounded by a perimeter seal, with the interpane cavity being fillable with an electro-optic medium or fluid (in such applications, the inner surfaces of the glass substrates are coated with an electrically conductive film or coating or the like, but the substrates may not have a reflective coating disposed thereat). The fixturing and conveying processes are substantially the same for any of these applications and/or for different designs or shapes of interior or exterior applications, while the laser deletion (or masking) and seal dispensing may be reconfigured or adjusted to accommodate the different mirror shapes for the different applications.

Note that electrochromic mirror cells or reflective element assemblies made such as by any of the processes of the present invention can be included in complete mirror assemblies that include a variety of added-features, such as lighting, telematics functionality and electronics, such as are disclosed in U.S. Pat. Nos. 7,657,052; 7,308,341; 7,195,381; 7,167,796; 7,004,593; 6,690,268; 6,477,464; 6,472,979; 6,445,287; 6,420,975; 6,294,989; 6,278,377; 6,243,003; 6,042,253; 5,938,321; 5,924,212; 5,813,745; 5,820,245; 5,669,698; 5,673,994; 5,671,996; 5,649,756; 5,632,092; 5,255,442; 5,178,448; 5,131,154; 4,937,945; 4,862,594; 4,807,096; 4,733,336 and/or 4,646,210, which are all hereby incorporated herein by reference in their entireties.

Changes and modifications in the specifically described embodiments may be carried out without departing from the principles of the present invention, which is intended to be limited only by the scope of the appended claims, as interpreted according to the principles of patent law.

The invention claimed is:

1. A system for filling a variable reflectance vehicular electrochromic rearview mirror reflective element, said system comprising:
   a filling crucible;
   a compressible sealing element having a passageway therethrough;
   a fixture configured to support an unfilled mirror cell, wherein the unfilled mirror cell comprises a front glass substrate and a rear glass substrate joined by a perimeter seal, and wherein the perimeter seal spaces the front and rear glass substrates apart and establishes an interpane cavity therebetween, and wherein the perimeter seal has a gap between terminal ends of the perimeter seal to establish a fill port for the unfilled mirror cell;
   wherein said filling crucible comprises (i) a fluid reservoir configured to receive electrochromic fluid medium therein, (ii) a mirror cell receiving portion and (iii) a channel that provides fluid communication between said fluid reservoir and said mirror cell receiving portion;
   wherein said mirror cell receiving portion of said filling crucible is shaped to receive a perimeter portion of the unfilled mirror cell therein such that the fill port of the unfilled mirror cell is aligned with said channel of said filling crucible;

wherein, with the unfilled mirror cell supported at said fixture, the fill port of the unfilled mirror cell is disposed at an upper perimeter portion of the unfilled mirror cell; and wherein, with the unfilled mirror cell supported at said fixture, said mirror cell receiving portion of said filling crucible receives the upper perimeter portion of the unfilled mirror cell with said compressible sealing element between said filling crucible and the unfilled mirror cell such that said filling crucible seals at the unfilled mirror cell around said fill port via said compressible sealing element.

2. The system of claim 1, wherein the unfilled mirror cell does not include spacing beads disposed in the interpane cavity.

3. The system of claim 1, wherein said filling crucible is configured to allow electrochromic fluid medium disposed at said fluid reservoir flows to flow through said channel of said filling crucible and through said passageway of said compressible sealing element and through the fill port of the unfilled mirror for gravity feed filling of the unfilled mirror cell.

4. The system of claim 1, wherein said filling crucible is configured to allow electrochromic fluid medium disposed at said fluid reservoir to flow through said channel of said filling crucible and through said passageway of said compressible sealing element and through the fill port of the unfilled mirror cell for pressurized filling of the unfilled mirror cell.

5. The system of claim 4, wherein said fluid reservoir of said filling crucible comprises a tube port that receives a tube that is configured to provide pressurized electrochromic fluid medium.

6. The system of claim 1, wherein said filling crucible comprises polytetrafluoroethylene (PTFE).

7. The system of claim 1, wherein said filling crucible comprises a two piece construction having first and second portions attached together, and wherein said fluid reservoir, said passageway and said mirror cell receiving portion are partially formed at an internal surface of each of said first and second portions.

8. The system of claim 1, wherein the front glass substrate has a transparent electrically conductive coating disposed at a surface facing the interpane cavity, and wherein the rear glass substrate has an electrically conductive coating disposed at a surface facing the interpane cavity.

9. The system of claim 1, wherein said fixture is configured to support the unfilled mirror cell in a vertical orientation with the fill port at an uppermost portion of the unfilled mirror cell.

10. The system of claim 9, wherein said fixture is configured to support the unfilled mirror cell at an angled vertical orientation so that the front and rear glass substrates are at an angle relative to vertical.

11. A system for filling a variable reflectance vehicular electrochromic rearview mirror reflective element, said system comprising:

a filling crucible;

a compressible sealing element having a passageway therethrough;

a fixture configured to support an unfilled mirror cell, wherein the unfilled mirror cell comprises a front glass substrate and a rear glass substrate joined by a perimeter seal, and wherein the perimeter seal spaces the front and rear glass substrates apart and establishes an interpane cavity therebetween, and wherein the perimeter seal has a gap between terminal ends of the perimeter seal to establish a fill port for the unfilled mirror cell;

wherein said filling crucible comprises (i) a fluid reservoir configured to receive electrochromic fluid medium therein, (ii) a mirror cell receiving portion and (iii) a channel that provides fluid communication between said fluid reservoir and said mirror cell receiving portion;

wherein said filling crucible comprises a two piece construction having first and second portions attached together, and wherein said fluid reservoir, said passageway and said mirror cell receiving portion are partially formed at an internal surface of each of said first and second portions;

wherein said mirror cell receiving portion of said filling crucible is shaped to receive a perimeter portion of the unfilled mirror cell therein such that the fill port of the unfilled mirror cell is aligned with said channel of said filling crucible;

wherein, with the unfilled mirror cell supported at said fixture, the fill port of the unfilled mirror cell is disposed at an upper perimeter portion of the unfilled mirror cell;

wherein said fixture is configured to support the unfilled mirror cell in a vertical orientation with the fill port at an uppermost portion of the unfilled mirror cell; and wherein, with the unfilled mirror cell supported at said fixture, said mirror cell receiving portion of said filling crucible receives the upper perimeter portion of the unfilled mirror cell with said compressible sealing element between said filling crucible and the unfilled mirror cell such that said filling crucible seals at the unfilled mirror cell around said fill port via said compressible sealing element.

12. The system of claim 11, wherein said filling crucible is configured to allow electrochromic fluid medium disposed at said fluid reservoir to flow through said channel of said filling crucible and through said passageway of said compressible sealing element and through the fill port of the unfilled mirror cell for gravity feed filling of the unfilled mirror cell.

13. The system of claim 11, wherein said filling crucible is configured to allow the electrochromic fluid medium disposed at said fluid reservoir to flow through said channel of said filling crucible and through said passageway of said compressible sealing element and through the fill port of the unfilled mirror cell for pressurized filling of the unfilled mirror cell.

14. The system of claim 13, wherein said fluid reservoir of said filling crucible comprises a tube port that receives a tube that is configured to provide pressurized electrochromic fluid medium.

15. The system of claim 11, wherein the front glass substrate has a transparent electrically conductive coating disposed at a surface facing the interpane cavity, and wherein the rear glass substrate has an electrically conductive coating disposed at a surface facing the interpane cavity.

16. A system for filling a variable reflectance vehicular electrochromic rearview mirror reflective element, said system comprising:

a filling crucible;

a compressible sealing element having a passageway therethrough;

a fixture configured to support an unfilled mirror cell, wherein the unfilled mirror cell comprises a front glass substrate and a rear glass substrate joined by a perimeter seal, and wherein the perimeter seal spaces the front and rear glass substrates apart and establishes an interpane cavity therebetween, and wherein the perimeter seal has a gap between terminal ends of the perimeter seal to establish a fill port for the unfilled mirror cell;

wherein said filling crucible comprises (i) a fluid reservoir configured to receive electrochromic fluid medium therein, (ii) a mirror cell receiving portion and (iii) a channel that provides fluid communication between said fluid reservoir and said mirror cell receiving portion;

wherein said mirror cell receiving portion of said filling crucible is shaped to receive a perimeter portion of the unfilled mirror cell therein such that the fill port of the unfilled mirror cell is aligned with said channel of said filling crucible;

wherein, with the unfilled mirror cell supported at said fixture, the fill port of the unfilled mirror cell is disposed at an upper perimeter portion of the unfilled mirror cell;

wherein said fixture is configured to support the unfilled mirror cell in a vertical orientation with the fill port at an uppermost portion of the unfilled mirror cell;

wherein the unfilled mirror cell does not include spacing beads disposed in the interpane cavity; and wherein, with the unfilled mirror cell supported at said fixture, said mirror cell receiving portion of said filling crucible receives the upper perimeter portion of the unfilled mirror cell with said compressible sealing element between said filling crucible and the unfilled mirror cell such that said filling crucible seals at the unfilled mirror cell around said fill port via said compressible sealing element.

17. The system of claim 16, wherein said filling crucible is configured to allow electrochromic fluid medium disposed at said fluid reservoir to flow through said channel of said filling crucible and through said passageway of said compressible sealing element and through the fill port of the unfilled mirror cell for gravity feed filling of the unfilled mirror cell.

18. The system of claim 16, wherein said filling crucible is configured to allow electrochromic fluid medium disposed at said fluid reservoir to flow through said channel of said filling crucible and through said passageway of said compressible sealing element and through the fill port of the unfilled mirror cell for pressurized filling of the unfilled mirror cell.

* * * * *

UNITED STATES PATENT AND TRADEMARK OFFICE
CERTIFICATE OF CORRECTION

| | | |
|---|---|---|
| PATENT NO. | : 10,782,584 B2 | Page 1 of 1 |
| APPLICATION NO. | : 15/899100 | |
| DATED | : September 22, 2020 | |
| INVENTOR(S) | : Hamid Habibi et al. | |

It is certified that error appears in the above-identified patent and that said Letters Patent is hereby corrected as shown below:

In the Specification

Column 3
Line 30, "transfiective" should be --transflective--

Column 8
Line 2, "(10)" should be --(IO)--
Line 19, "transfiective" should be --transflective--

Column 10
Line 50, "transfiective" should be --transflective--
Line 56, "transfiective" should be --transflective--

In the Claims

Column 15
Line 21, Claim 3, remove "flows" after "reservoir"

Column 16
Line 47, Claim 13, remove "the" after "configured to allow"

Signed and Sealed this
Twentieth Day of October, 2020

Andrei Iancu
*Director of the United States Patent and Trademark Office*